United States Patent
Porta et al.

(10) Patent No.: US 8,480,099 B2
(45) Date of Patent: Jul. 9, 2013

(54) APPARATUS AND METHOD FOR ADJUSTING TOE ANGLE IN THE WHEELS OF A SOLID AXLE

(76) Inventors: Scott S. Porta, Edgewater, FL (US); Michael C. Loescher, Edgewater, FL (US)

(*) Notice: Subject to any disclaimer, the term of this patent is extended or adjusted under 35 U.S.C. 154(b) by 99 days.

(21) Appl. No.: 13/134,585

(22) Filed: Jun. 13, 2011

(65) Prior Publication Data
US 2012/0313337 A1    Dec. 13, 2012

(51) Int. Cl.
*B62D 17/00* (2006.01)
(52) U.S. Cl.
USPC ............. 280/86.75; 280/86.758; 280/86.755; 301/129
(58) Field of Classification Search
USPC ............. 280/86.75, 86.758, 86.755; 301/129
See application file for complete search history.

(56) References Cited

U.S. PATENT DOCUMENTS

| | | | | |
|---|---|---|---|---|
| 242,480 A * | 6/1881 | Schofield | ...................... | 301/129 |
| 507,181 A * | 10/1893 | Taylor | ........................... | 301/129 |
| 844,029 A * | 2/1907 | Lease | ............................. | 301/129 |
| 1,144,443 A * | 6/1915 | Sunvold | ........................ | 301/129 |
| 1,153,996 A * | 9/1915 | Brocksmith | ................... | 301/129 |
| 1,299,732 A * | 4/1919 | Kelly | ............................. | 301/129 |
| 1,765,066 A * | 6/1930 | Fogger | .......................... | 301/125 |
| 2,073,322 A * | 3/1937 | Siemiana | ..................... | 280/6.16 |
| 2,522,066 A * | 9/1950 | Smith | ........................ | 33/203.17 |
| 2,602,007 A * | 7/1952 | Van Der Wilt | ................ | 301/129 |
| 3,095,242 A * | 6/1963 | Van Der Wilt | ................ | 301/129 |
| 3,410,575 A * | 11/1968 | Turnbull et al. | ............. | 280/86.75 |
| 4,310,200 A * | 1/1982 | Olender | ......................... | 301/129 |
| 4,537,420 A * | 8/1985 | Ito et al. | ....................... | 280/86.75 |
| 4,863,267 A * | 9/1989 | Bendickson et al. | ......... | 356/155 |
| 4,867,472 A * | 9/1989 | Ward | ......................... | 280/86.753 |
| 5,645,294 A * | 7/1997 | Ward | .......................... | 280/86.75 |
| 5,724,743 A * | 3/1998 | Jackson | .......................... | 33/288 |
| 5,941,545 A * | 8/1999 | Park | ........................... | 280/86.758 |
| 6,047,789 A * | 4/2000 | Iwanaga | ........................ | 180/440 |
| 6,402,168 B1 * | 6/2002 | Chino et al. | .............. | 280/86.758 |
| 6,435,527 B1 * | 8/2002 | Katae | ......................... | 280/86.758 |
| 6,823,598 B1 | 11/2004 | Loescher | | |
| 6,962,356 B2 * | 11/2005 | Kwon | .......................... | 280/86.75 |
| 7,325,818 B1 * | 2/2008 | Kwon | ....................... | 280/86.758 |
| 7,850,178 B2 * | 12/2010 | Fischer et al. | ............. | 280/86.758 |
| 8,205,892 B2 * | 6/2012 | Mackin et al. | .............. | 280/5.522 |
| 2007/0273117 A1 * | 11/2007 | Kwon | .......................... | 280/86.75 |
| 2012/0013098 A1 * | 1/2012 | Hart | ........................... | 280/250.1 |

* cited by examiner

*Primary Examiner* — Nicole Verley
(74) *Attorney, Agent, or Firm* — William M. Hobby, III

(57) ABSTRACT

The present invention relates to an apparatus and method for adjusting the toe angle in the wheels of a solid non-steering axle and especially to a method and apparatus for bending a vehicle's solid or non-steering axle housing, such as the solid rear axle of a vehicle or an axle of a semi-trailer, to align the toe angle of the wheels mounted on the solid axle.

10 Claims, 3 Drawing Sheets

APPARATUS AND METHOD FOR ADJUSTING TOE ANGLE IN THE WHEELS OF A SOLID AXLE

BACKGROUND OF THE INVENTION

The present invention relates to an apparatus and method of bending a vehicle's axle and especially to a method and apparatus for bending a vehicle's solid or non-steering axle, such as the solid rear axle of a vehicle or a solid axle of a semi-trailer, to align the toe angle of the wheels mounted to the solid axle.

Properly aligned wheels of a vehicle have long been a necessity for long tire life, handling ease and for achieving optimal fuel economy. The vehicle wheels need to travel in a straight line, with all wheels pointing in the same direction. That is, all four wheels must be square to each other and square to the road surface. All four wheels need to be parallel to one another and the axles perpendicular to a common center line.

Full attention has generally focused on the alignment of the front wheels. However, a misaligned solid rear axle housing and axle, or the solid axle housing on a semi-trailer, can also result in reduced tire life and reduced fuel economy. A mis-aligned axle causes excessive tire drag and creates undesirable lateral forces. Even in new trucks, studies have shown that most solid axles need alignment to align the solid axle housing and axles relative to the suspension element and frame of the vehicle and to adjust the toe angle of the wheels mounted on the axle. The vehicle wheels need to be parallel to one another. Because of the increased tire wear and reduced fuel economy, even small mis-alignments of a fixed axle become particularly important for freight carrying vehicles that must travel long distances. However, obtaining the proper alignment in an assembly line setting is difficult as is the minute adjustment that must be made quickly and accurately.

It has been common to perform a front end alignment using laser based wheel alignment systems. The axis about which the front wheel of an automobile or truck turns as it travels down the road must be carefully set to minimize tire wear, for safety and for stable handling characteristics. The orientation of these axes is determined by three angles. The toe angle specifies the angle between the rim of the wheels and a line drawn parallel to the direction in which the vehicle is pointed while the camber angle specifies the angle between the rim of the wheels and vertical while the caster angle specifies the angle between the vertical and the axes about which individual wheels turn when changing direction. These angles are specified individually for each wheel for each model and make of a vehicle. It must be periodically tested and reset to ensure continued economic and safe vehicle performance. However, in addition to front wheel alignment, it is desirable to set the toe angle of a solid rear axle or semi-truck trailer solid axles to avoid wheel scrub or dog tracking and reduced tire wear and reduced mileage for the vehicle.

The present invention is directed to correcting the toe angle of wheels mounted to a solid rear or trailer axle housing to reduce scrub in the axle wheels. The wheel angle being only slightly out of alignment will produce increased tire wear and reduced mileage for a vehicle. A laser alignment system is used for aligning both the front end and the wheels mounted to an axle having a solid axle housing in which a laser is attached to each vehicle wheel spindle or hub, as set forth in the Loescher U.S. Pat. No. 6,823,598. The lasers are pointed at targets to measure and bring the wheels into proper alignment.

SUMMARY OF THE INVENTION

The present invention relates to a laser alignment system and especially to alignment of the toe angle of vehicle wheels mounted to an axle having a solid or non-steering axle housing to eliminate scrub in the wheels, reduced mileage, and increased wear on the tires mounted on the wheels of a vehicle.

An apparatus is provided for adjusting the toe angle of wheels mounted on an axle having a solid axle housing. The apparatus includes a pair of axle housing collars with each collar being shaped to be attached onto opposite ends of a vehicle solid axle housing and a center truss member shaped for attachment to the center portion of a vehicle solid axle housing between the pair of axle housing collars. The center truss member extends horizontally away from said axle housing and may be attached to the differential of a vehicle axle housing having a rear end differential. A pair of adjustable tie rods each being adjustable as to length and each having two ends. Each tie rod has one end thereof movably attached to the truss member with the other end being movably attached to one of the axle housing collars so that adjusting the length of the tie rods attached to a solid axle housing bends the solid axle housing. A pair of wheels attached to an axle of a solid axle housing are adjusted for toe angle by bending the solid axle housing by varying the length of attached adjustable tie rods.

A method of adjusting the toe angle of wheels mounted on a vehicle's axle having a solid axle housing starts with the step of selecting a pair of axle housing collars and attaching each selected collar onto opposite ends of a vehicle solid axle housing. The next step is selecting a center truss member and attaching it to the center portion of a vehicle solid axle housing between the pair of attached axle housing collars. Then selecting a pair of adjustable tie rods and movably attaching each selected tie rod between one attached collar and the attached truss member. Then adjusting the length of each tie rod to vary the length thereof to bend a solid axle housing in order to adjust the toe angle of a pair of wheels attached to a solid axle by bending the solid axle housing by varying the length of attached tie rods to move the axle housing.

The method includes the step of attaching a laser to the axle housing or axle and positioning a target to measure the toe angle in the wheels mounted to the axle having a solid non-steering axle housing.

BRIEF DESCRIPTION OF THE DRAWINGS

The accompanying drawings which are included to provide a further understanding of the invention are incorporated in and constitute a part of the specifications to illustrate an embodiment of the invention and, together with the description, serve to explain the principles of the invention.
In the Drawings

DETAILED DESCRIPTION OF THE EXEMPLARY EMBODIMENTS

Figure 1:
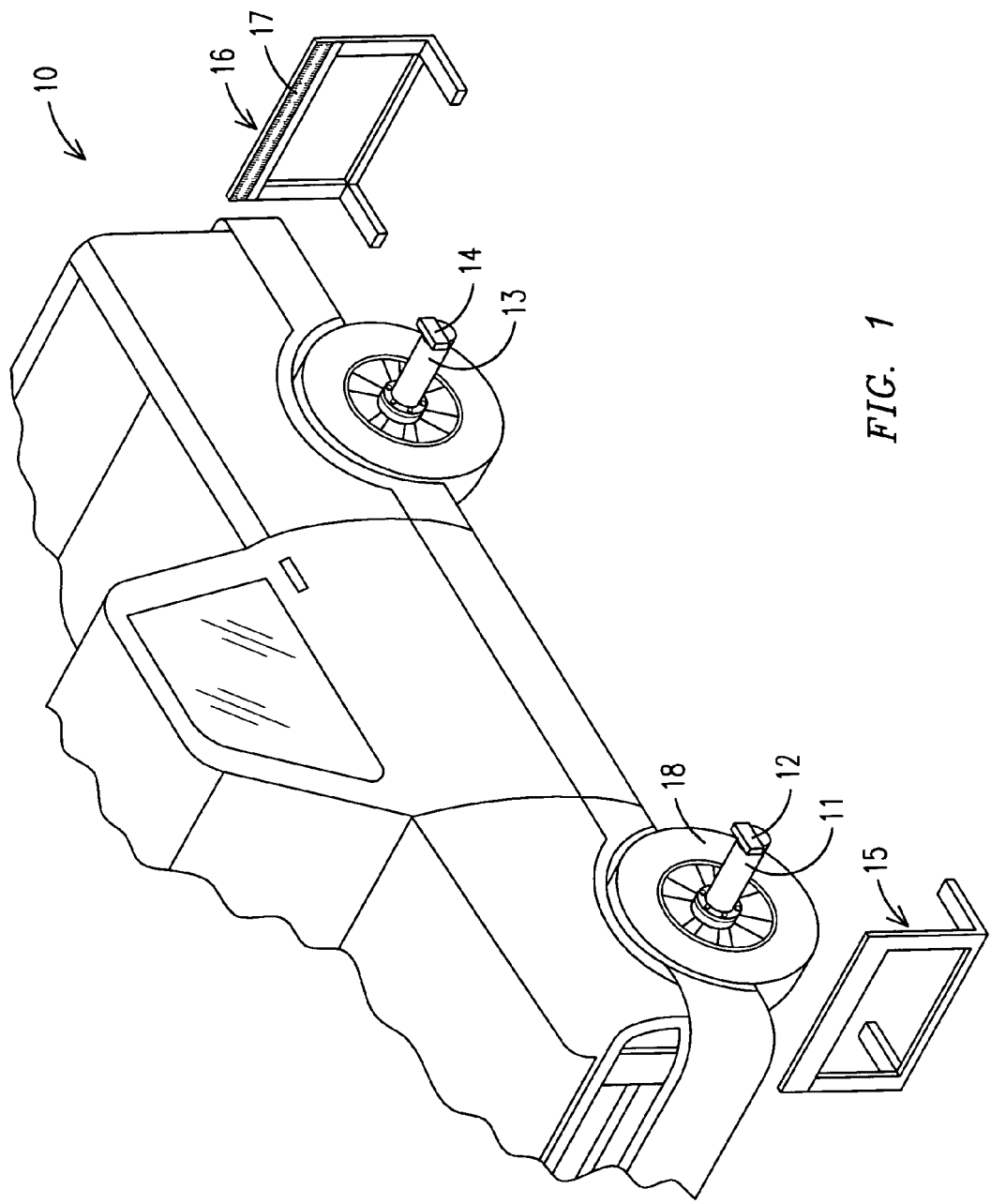
FIG. 1 is a partial perspective view of a truck having a laser alignment system attached thereto and targets therefor.

Referring to FIG. 1, a pickup truck 10 is illustrated having a laser supporting attachment 11 attached to a vehicle front wheel spindle or hub for supporting a laser 12. A laser supporting attachment 13 is attached to the rear axle spindle or hub and supports a rear axle laser 14. Lasers are attached to all four wheels of the vehicle during the alignment of the wheels and axles. The laser supporting attachments 11 and 13 for the vehicle wheel hub use the laser supporting attachment for a vehicle, alignment system in accordance with the Loescher patent, U.S. Pat. No. 6,823,598. The target 15 is mounted in front of the vehicle 10 while a rear target 16 is mounted to the rear of a vehicle. Each target has a series of target gradations 17 thereon to which the light beam from lasers 12 and 14 are directed. During the laser alignment of the vehicles wheels 18, the front wheels are aligned for toe angle. The use of a laser alignment system using lasers and targets allows for a more precise front end and rear end alignment for the wheels of the vehicle. The lasers are also used to indicate the toe angle of vehicle wheels having a solid axle housing including the axles of a semi-trailer or truck 10. Correcting misaligned toe angle, or toe-in or toe-out, in the wheels of a solid non-steering axle housing of a vehicle reduces tire wear and increases vehicle fuel mileage.

Figure 3:
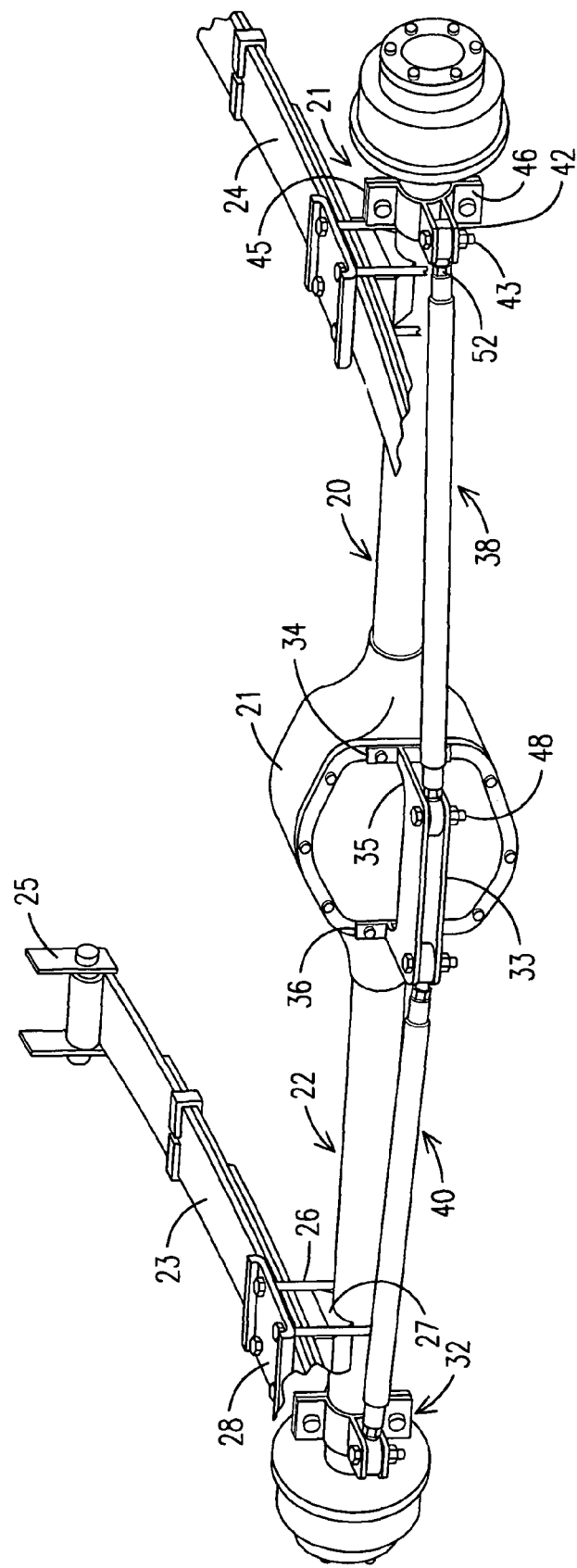
FIG. 3 is a vehicle's axle having a solid non-steering axle housing having the axle housing bending apparatus of FIG. 2 attached thereto for bending the solid axle housing to adjust the toe angle of wheels mounted to the axle.

Turning to FIG. 3, a rear axle 20 has a differential 21 therein and has a fixed rear axle housing 22 extending from the differential. The axle housing 22 is held at each end to the leaf springs 23 and 24. The leaf springs in turn are attached to the chassis of the vehicle and hold the fixed axle 20 to the vehicle chassis through the leaf springs 23 and 24, one end of each leaf spring is mounted to the chassis with a shackle 25 to allow for the movement of the leaf springs 23 and 24. The leaf springs are attached to the axle housing 22 using a pair of U-bolts 26 which extend around the axle housing 22 and an axle perch 27 and over the springs 23 and 24 and are bolted to a spring perch 28.

Figure 2:
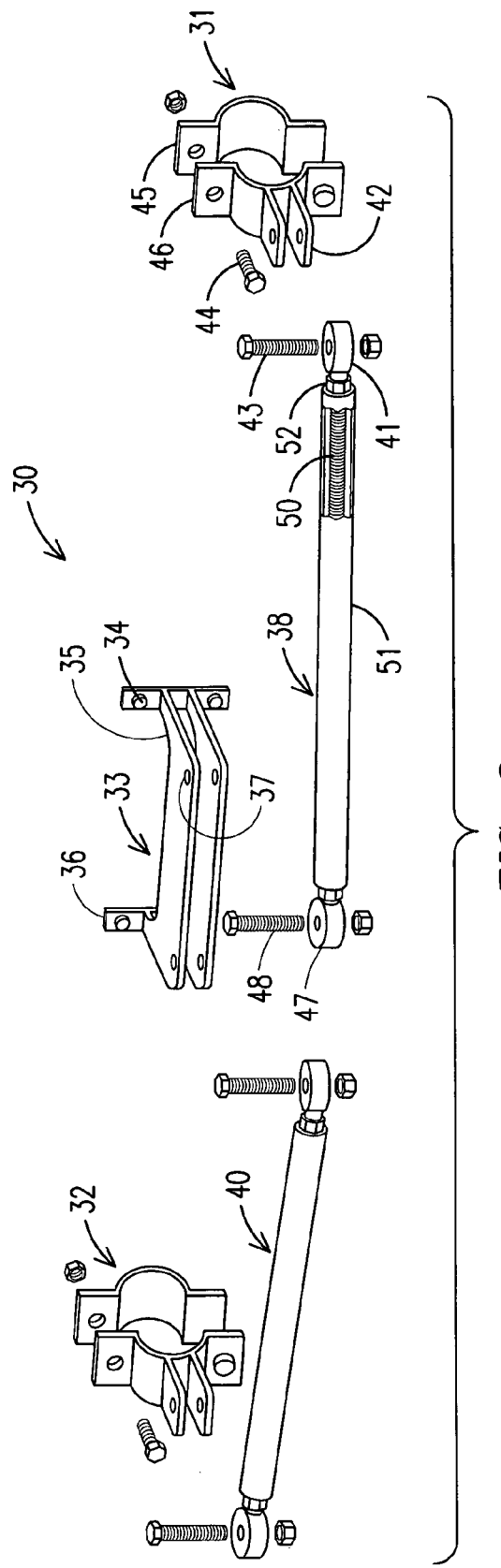
FIG. 2 is an exploded perspective view of an axle bending apparatus for bending a vehicle's solid axle housing in accordance with the present invention.

In the present invention, the apparatus 30 as seen in FIGS. 2 and 3, has axle housing collars 31 and 32 which are bolted onto the axle 20 housing 22 as seen in FIG. 3. A center truss member is bolted onto the differential 21 in FIG. 3 with bolts 34. The truss member 33 has a pair of horizontal truss plates 35 each having a pair of arms 35 attached to perpendicular feet 36 the truss plates have openings 37 therethrough on the outer edges thereof. A pair of adjustable tie rods 38 and are shown attached between the axle collars 31 and 32 and the center truss 33. Tie rod 38 is attached between the collar 31 and the center truss 33 while tie rod 40 is attached between the collar 32 and the center truss 33 as seen in FIG. 3. Each tie rod has a coupling 41 on one end thereof which fits in a yoke 42 of each collar 31 and 32 and is movably attached with a bolt 43. Each collar 31 and 32 is bolted around the axle housing with bolts 44, bolting each collar half 45 and 46 together over the axle housing 22. The other end of each tie rod 38 and 40 has a coupling 47 on the end thereof for coupling to the center truss 33 using a bolt 48. Each coupling 41 and 47 on each end of the tie rods and 40 is attached to a threaded rod 50 threadedly attached to the tie rod body 51 and has a hex nut fixedly attached thereto so that each tie rod 38 and 40 can be lengthened or shortened by rotating the threaded rod 50 into or out of the tie rod housing 51. The treaded rod 50 on each end of the tie rod 38 can be threaded into or out of the housing 51 for either tie rod 38 or 40 with a wrench using wrench flats on each end of the tire rod then locking the hex nuts 52 against the tie rod housing end.

As seen in FIG. 3, the axle housing bending apparatus 30 is attached to the axle housing 22. The tie rods can be elongated or shortened to push or pull the axle collars away from or towards the center truss 33 which will in turn bend the axle housing 22 and shift the position of the axle therein to change the toe angle of any wheel attached to each end of the axle 20. Generally only a very small adjustment of the angle is required to bring the wheels into alignment. The amount of bending necessary is determined by the laser beams from the lasers 12 and 14 impingement onto the targets 15 and 16. It will be understood that the lasers are mounted on all four wheels.

The process of the present invention includes the steps of mounting the lasers to the vehicle wheel spindles or hubs and positioning targets for directing the laser beams to check and correct the alignment of the wheels. This includes the step of selecting the apparatus 30 including selecting a pair of axle housing collars 31 and 32 and attaching them to the axle 20 housing 22. Next the center truss member 33 is selected and attached to the center portion of the axle 20 housing 22 which may be attached to a differential 21 where the axle 20 includes a differential. Then a pair of adjustable tie rods 38 and 40 are selected and attached between the center truss member and the axle housing collars. The adjustable tie rods 38 and 40 are then elongated or contracted to bend the axle 20 housing 22 and align the toe angle of the wheels attached to the vehicle axle 20 as indicated by the laser beams impinging upon the targets 15 and 16.

It should be clear at this point that the system for aligning the toe angle of the wheels mounted on an axle having a solid non-steering axle housing has been provided which bends the axle housing that the wheels are mounted on. The method of adjusting the toe angle of wheels mounted on an axle having a solid axle housing an axle housing bender attached to the solid axle housing of a vehicle and bends the housing to align the wheels attached to the axle to bring the position of the wheels into alignment to improve the handling of the vehicle along with reduced tire wear and improved fuel mileage. However, the present invention is not to be considered as limited to the embodiments shown which are to be considered illustrative rather than restrictive.

We claim:

1. An apparatus for adjusting the toe angle of wheels mounted on a solid axle comprising:
   a pair of axle housing collars, each collar being shaped to be attached onto opposite ends of a vehicle solid axle housing having an axle differential;
   a center truss member shaped for removably bolting to said solid axle housing axle differential of a vehicle solid axle housing between said pair of axle housing collars, said center truss member extending generally horizontally away from said axle housing, said center truss member having a pair of openings therein; and
   a pair of adjustable tie rods, each tie rod being adjustable as to length and each tie rod having two ends, each said tie rod having one end thereof movably attached to one said truss member opening and each tie rod having the other end thereof movably attached to one of two said axle housing collars so that adjusting the length of said tie rods attached to a solid axle bends the solid axle;
   whereby the toe angle of a pair of wheels attached to a solid axle are adjusted for toe angle by bending the solid axle by varying the length of the attached tie rods.

2. The apparatus for adjusting the toe angle of wheels mounted on a solid axle in accordance with claim 1 in which each said tie rod has a threaded rod extending from one end rotatable to vary the length of the tie rod.

3. The apparatus for adjusting the toe angle of wheels mounted on a solid axle in accordance with claim 2 in which each of said axle housing collars is shaped to fit around an axle housing.

4. The apparatus for adjusting the toe angle of wheels mounted on a solid axle in accordance with claim 3 in which each said tie rod threaded rod has a hex head fixedly attached thereto for rotation thereof with a wrench.

5. The apparatus for adjusting the toe angle of wheels mounted on a solid axle in accordance with claim 3 in which said truss member has a plate having two extending arms, each arm having an attachment means for attaching to a solid axle.

6. A method of adjusting the toe angle of wheels mounted on a solid axle comprising the steps of:
   selecting a pair of axle housing collars;
   attaching each selected collar onto opposite ends of a vehicle solid axle housing;
   selecting a center truss member shaped for removably bolting to a solid axle differential, said center truss member extending generally horizontally away from said solid axle and having a pair of openings therein;
   attaching the selected truss member to the center portion of a vehicle solid axle housing between said pair of attached axle housing collars;
   selecting a pair of adjustable tie rods;
   movably attaching each selected tie rod between one attached collar and one said attached truss member opening; and
   adjusting the length of each tie rod to vary the length thereof to bend a solid axle housing;
   whereby the toe angle of a pair of wheels attached to a solid axle are adjusted by bending the solid axle by varying the length of attached tie rods.

7. The method of adjusting the toe angle of wheels mounted on a solid axle in accordance with claim 6 in which each selected tie rod has a threaded rod extending from one end thereof rotatable to vary the length of the tie rod.

8. The method of adjusting the toe angle of wheels mounted on a solid axle in accordance with claim 7 in which each selected axle housing collar is shaped to fit around an axle housing.

9. The method of adjusting the toe angle of wheels mounted on a solid axle in accordance with claim 8 in which each selected tie rod threaded rod has a wrench flat fixedly attached thereto for rotation thereof with a wrench.

10. The method of adjusting the toe angle of wheels mounted on a solid axle in accordance with claim 9 in which said selected truss member has a plate having two extending arms, each arm having attachment means for attaching to a solid axle.

* * * * *